Jan. 26, 1971 P. J. FRANKLIN 3,558,363

THERMAL CELL

Filed Feb. 8, 1952

INVENTOR.
Philip J. Franklin
BY
G. J. Kessenich + A. W. Daw
and F. E. McKee
ATTORNEYS
AGENT

United States Patent Office 3,558,363
Patented Jan. 26, 1971

3,558,363
THERMAL CELL
Philip J. Franklin, Washington, D.C., assignor to the United States of America as represented by the Secretary of the Army
Filed Feb. 8, 1952, Ser. No. 270,732
Int. Cl. H01m 21/14
U.S. Cl. 136—83                15 Claims In electronic devices for military use, it is frequently necessary that sources of electrical energy be supplied and that such sources be capable of long storage and rapid activation. It is also necessary that such sources be of minimum size compatible with output requirements. The reserve type electrochemical battery is a device of this class and in the present invention, the thermal cell, a form of such a battery is the device under consideration. Such cells consist essentially of two electrodes and an electrolyte, the latter being a solid and inactive at normal temperatures, but becoming liquid and active when subjected to heat.

In cells of this type, one problem is to provide a convenient source of heat, such that the heat transfer will be performed rapidly in order that no appreciable delay may be experienced in the activation of the cell. The source must also be small in size and easily operated by means of devices such as are normally used in fuses of ordnance missiles. The requirements for fuse applications are that the battery and heating element be extremely compact, capable of long storage and, if a combustible element be used, that the products of combustion not be gases. If a gas-producing combustible element were used in the thermal cell of invention which comprises a battery, heat-producing medium and initiation means therefor, the pressure created by the gas-producing combustible element would cause disruption of the cell and render it inoperative. Thermal cells heated by external means are well known in the art and may be found in literature dating back at least to "The Electrician" June 15, 1888, upon page 169 of which is a description of a cell of this type.

My invention consists primarily of various means of combining a heating compound with a known type of thermal cell. To achieve the required characteristics, however, it has been necessary to redesign the cell in order to produce rapid activation in a manner heretofore unknown. The specific nature of the invention as well as other objects and advantages thereof will clearly appear from the following description and accompanying drawings in which.

Figure 1:
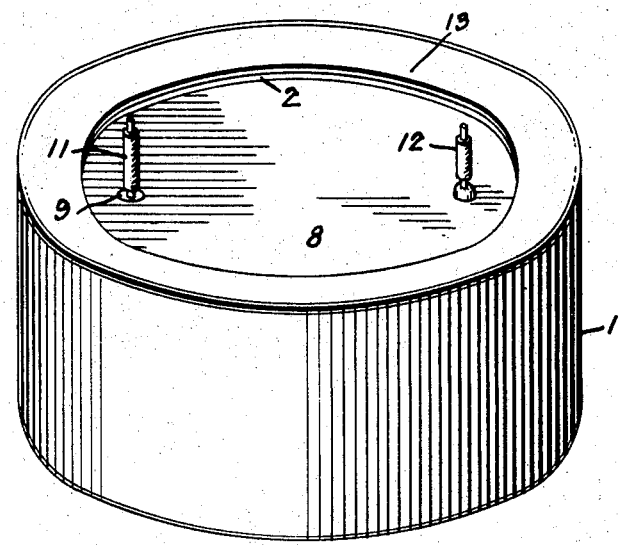
FIG. 1 is a perspective view of one form which my thermal cell and heating element may take.
Figure 2:
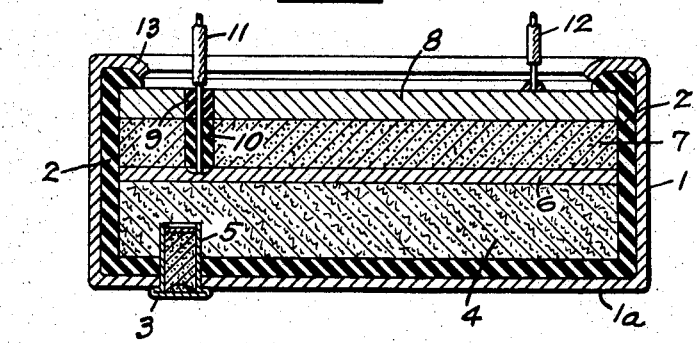
FIG. 2 is a vertical cross sectional view of the cell of FIG. 1.

Referring more particularly to the drawings wherein like reference characters designate the same parts throughout the several views, number 1 indicates a container, having a bottom member 1a, which serves as a housing for the cell and which is provided with an asbestos or other noncombustible nonconductive liner 2. Affixed in the bottom member 1a of the container and projecting inwardly thereof is a percussion igniter 3. A heat-producing compound 4 is positioned in the container adjacent the inner surface of bottom 1a is formed with a recess 5 for receiving the inwardly projecting portion of igniter 3. Materials such as aluminum, beryllium and the like may be used as the heat-producing compound in this cell. An electrode 6, comprising the anode of the cell, is placed on top of the heat-producing compounds. The anode is made of very thin sheet iron so as to afford a rapid transfer of heat from the heat-producing compound to the electrolyte 7 when the compound is ignited by igniter 3. Further, the anode is placed intermediate the heat-producing compound and the bottom surface of the electrolyte because the anode will not dissolve and is less subject to attack than the cathode 8 which is a magnesium electrode positioned on the top surface of the electrolyte. The electrolyte may be a dry solid such as sodium hydroxide or an eutectic mixture of potassium and lithium chlorides with a small percentage of potassium dichromate as a depolarizer in a disk or any other desirable shape. The cathode and electrolyte are provided with insulating bushings 9 and 10, respectively, which are aligned and through which is threaded the anode lead 11. The cathode is provided with a lead 12 affixed thereto in any conventional manner. The edge of the open end of the container is crimped or rolled as indicated by reference numeral 13 and thereby retain the elements of the cell in the housing.

Figure 3:
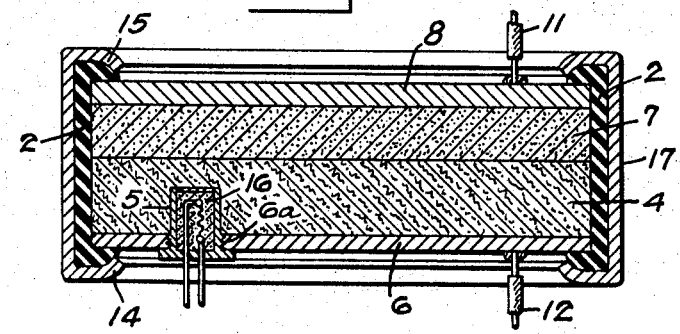
FIG. 3 is a similar view showing a modification of the cell.

In FIG. 3 there is shown a thermal cell of the invention wherein a more rapid heating is obtained. In this modification the elements of the cell comprise a pile wherein the first layer is the anode 6, the second layer is the heat-producing compound 4, the third layer is the solid electrolyte 7 and the fourth layer is the cathode 8. The pile, thus assembled, is placed in a sleeve 17 provided with liner 2. The open ends of the sleeve are then crimped as at 14 and 15 to retain the pile therein. An electric igniter 16 is positioned in perforation 6a of the anode and projects inwardly of the pile into the recess 5 formed in the heat-producing compound 4. In the modification, the heat-producing compound is enabled to act directly upon the electrolyte without any thermal lag caused by the necessity of transferring heat through an electrode. Heat-producing materials such as nickel and sulfur are employed in the modification, because such resulting compounds become conductive when ignited and act as good conductors between the electrolyte and the anode. This modification of the thermal cell, occupying approximately one cubic inch, becomes activated 0.5 second after initiation of the igniter and produces a current of 10 amperes at 1½ volts for a period of two minutes.

In the manufacture of the thermal cell, the materials used therein shall be desiccated by heating to at least 50° C. above the melting of the electrolyte for a period such that, upon cooling, no voltage will appear across the cell when measured by an electrometer. The cells will be sealed either in dry air, vacuum or in an atmosphere of inert gas, such as dry nitrogen, in order to prevent deterioration.

It will be apparent that the embodiments shown are only exemplary and that various modifications can be made in construction and arrangement within the scope of the invention as defined in the appended claims, as for example, the cell may take the form of a rod-like cathode run axially of a cylindrical anode, the space between the anode and cathode being filled with solid electrolyte and the cylinder being packed in heat-producing material surrounded by an outer container.

I claim:
1. A reserve-type battery cell device comprising in combination: a container, an anode and a cathode mounted in said container in a spaced relationship, an electrolyte material normally in the solid state mounted in said container intermediate said anode and cathode, a heat-producing compound also mounted in said container, said compound being of the class of compounds having non-gaseous combustion products, and ignition means affixed in said container and projecting into said heat-producing compound, said ignition means being adapted for igniting said compound, said compound being so constructed and arranged that ignition of said compound causes sufficient heat to be applied to said electrolyte material to activate said battery cell device.

2. A reserve-type battery cell device comprising in combination: a container formed with a closed end, a heat resistant liner in said container, a layer of heat-producing compound in said container adjacent its interior bottom surface, said compound being of the class of compounds having non-gaseous combustion products, an anode mounted in said container on top of said compound, a cathode mounted in spaced relationship to said anode and forming a closure for the open end of said container, an electrolyte material normally in the solid state mounted intermediate and in contact with said cathode and anode, and percussion igniter means affixed in the closed end of said container and projecting into said heat-producing compound, said percussion igniter means being adapted to ignite said compound, said compound being so constructed and arranged that ignition of said compound causes sufficient heat to be applied to said electrolyte material to activate said battery cell device.

3. The invention in accordance with claim 2 wherein said anode is made of sheet iron, said cathode is made of magnesium, and said electrolyte material is an eutectic mixture of chlorides having a melting point lower than the melting point of either the cathode or anode.

4. A reserve-type battery cell device comprising in combination: a container, a heat resistant liner in said container, an anode affixed in one end of said container and forming a closure therefor, a cathode affixed in the opposite end of said container and forming a closure therefor, an electrolyte material normally in the solid state in contact with said cathode, a heat producing compound positioned in said container between and in contact with said anode and said electrolyte material, said compound being of the class of compounds which become conductive when ignited and have non-gaseous combustion products, and electric igniter means affixed to said anode and projecting into said heat producing compound, said igniter means being adapted to ignite said compound, said compound and said electrolyte material being so constructed and arranged so that ignition of said compound causes sufficient heat to be applied to said electrolyte material to activate said battery cell device.

5. The invention in accordance with claim 4 wherein said anode is made of sheet iron, said cathode is made of magnesium, said electrolytic material is an eutectic mixture of chlorides having a melting point lower than the melting point of either the cathode or anode, and said heat producing compound is made up of a mixture of nickle and sulphur.

6. A self-contained thermal cell comprising a metallic positive electrode, a metallic negative electrode spaced from said positive electrode, an inorganic salt disposed between said electrodes in contact therewith, said salt being solid and electrically non-conducting in the cell at normal temperatures but becoming an electrolyte when heated, a combustible substantially non-gas-producing charge contained in the cell for supplying heat to the electrolyte, and means for igniting said charge to render the cell functionally active to produce electric current.

7. The thermal cell according to claim 6 wherein said charge contains a metal powder.

8. The thermal cell according to claim 7 wherein said metal powder is nickel.

9. The thermal cell according to claim 6 wherein said charge is a mixture of nickel powder and sulfur powder.

10. A thermal, or deferred action, cell comprising spaced metallic positive and negative electrodes, an electrolyte disposed between said electrodes and being solid and electrically non-conducting in the cell at normal storage temperatures but becoming electrically active in the molten state, and a combustible substantially non-gas-producing charge contained in the cell to melt said electrolyte.

11. The thermal cell according to claim 10 wherein said charge contains a metal powder.

12. The thermal cell according to claim 11 wherein said metal powder is nickel.

13. The termal cell according to claim 10 wherein said charge is a mixture of nickel powder and sulfur powder.

14. A cell according to claim 6, the cell containing also a depolarizer.

15. A cell according to claim 10, the cell containing also a depolarizer.

References Cited

UNITED STATES PATENTS

| 713,652 | 11/1902 | Kitsee | 136—90.5 |
| 2,081,926 | 6/1937 | Gyuris | 136—83 |

FOREIGN PATENTS

| 8,642 | 1916 | Great Britain. |

OTHER REFERENCES

Vinal: "Primary Batteries," pp.324–329 (1950).

ALLEN B. CURTIS, Primary Examiner

U.S. Cl. X.R.

340—228